United States Patent
Bode (12)

(10) Patent No.: US 6,193,022 B1
(45) Date of Patent: Feb. 27, 2001

(54) ACTUATION DEVICE FOR A CABLE-OPERATED PARKING BRAKE FOR A MOTOR VEHICLE

(75) Inventor: Sven Bode, Remscheid (DE)

(73) Assignee: ED. Scharwächter GmbH, Remscheid (DE)

( * ) Notice: Subject to any disclaimer, the term of this patent is extended or adjusted under 35 U.S.C. 154(b) by 0 days.

(21) Appl. No.: 09/226,822

(22) Filed: Jan. 6, 1999

(30) Foreign Application Priority Data

Jan. 10, 1998 (DE) .............................................. 198 00 679

(51) Int. Cl.$^7$ ....................................................... B60T 1/00
(52) U.S. Cl. ............................................................. 188/2 D
(58) Field of Search ................................ 188/2 D, 106 P, 188/156, 157, 162, 171, 72.9, 72.1, 72.8, 79.51, 79.54, 79.55, 196 R, 196 V, 196 B, 196 M, 271, 272; 74/388 R, 625, 535, 538; 475/154, 149

(56) References Cited

U.S. PATENT DOCUMENTS 3,814,222 * 6/1974 Koivunen ..................... 188/264 P X
4,817,463 * 4/1989 Cameron .......................... 188/2 D X
4,846,316 * 7/1989 Fujinami .............................. 188/271

* cited by examiner

Primary Examiner—Robert Oberleitner
Assistant Examiner—Melanie Talavera
(74) Attorney, Agent, or Firm—Brown & Wood, LLP

(57) ABSTRACT

An actuation device for a cable-operated parking brake of a motor vehicle and which enables actuation of the parking brake selectively by muscular energy or with a motive power assist, with the actuation device including a brake cable tightening device, and a drive for actuating the brake cable tightening device and including first and second drive elements connected, respectively, with muscular energy-actuated member and an auxiliary motor, and a planetary gear drive having a first drive member connectable with the first drive element, a second drive member connectable with the second drive element, and a third dive member connected with the cable tightening device thereby connecting the first and second drive element selectively with the cable tightening device.

18 Claims, 3 Drawing Sheets

ACTUATION DEVICE FOR A CABLE-OPERATED PARKING BRAKE FOR A MOTOR VEHICLE

BACKGROUND OF THE INVENTION

1. Field of the Invention

The present invention relates to an actuation device for a cable-operated parking brake of a motor vehicle and which enables actuation of the parking brake selectively by muscular energy or with a motive power assist, the actuation device including a muscular energy-actuated member for actuating the parking brake, an auxiliary motor for actuating the parking brake, a brake cable tightening device, and a drive for actuating the brake cable tightening device and including, first and second drive elements connected, respectively, with the muscular energy-actuated member and the auxiliary motor, and a connection element for selectively connecting one of the first and second drive elements with the brake cable tightening device.

2. Description of the Prior Art

Actuation devices of the type described above, with which a parking brake can be selectively actuated either by muscular energy or by an auxiliary motor, in particular, an electric motor, find lately ever increasing application in motor vehicles for improving an operational comfort of motor vehicles. Actuation devices of this type are available in many different embodiments.

Besides relatively simple actuation devices, with which the parking brake is actuated, during a normal course of operation, by an electric auxiliary motor and only in case of an abnormal occurrence, with a conventional brake lever by applying a muscular energy thereto, there exist actuation devices with which the parking brake can be arbitrary actuated either with a conventional hand brake lever or a pedal by applying a muscular energy thereto, or with a switch-actuated electric auxiliary motor. One of such actuation devices for an arbitrary selection of the type of actuation of a parking brake is disclosed in German Publication DE-OS 32 10 402. In the disclosed actuation device, a force transmitting member, which transmits the force applied to the pivotal hand brake lever to a tightening element of the parking brake, is formed as a cable secured to the hand brake lever at a distance from the pivot axis of the hand brake lever. Besides, the cable is enveloped by an electromotor-driven friction wheel, with the electromotor being secured either to the hand brake lever or being secured on the vehicle body, separately from the hand brake lever. In this actuation device, the electromotor actuating switch is mounted on the hand brake lever. When the hand brake lever is pivoted, to apply the brake, upward, the electromotor is actuated and the friction wheel transmits a power-assist force, which is added to the actuation force applied to the hand brake lever, to the cable-shaped power transmitting member. Actuation of the parking brake only with the electromotor in not possible with this actuation device.

In another known actuation device for a motor vehicle parking brake, a hand brake lever, which pivots about a stationary axle and is retained in different pivotal position by a pawl, is connectable with a cable pulley which forms a tightening element for the cable and is supported on the same axle as the hand brake lever. A drive connects an electromotor with the cable pulley. For selectively actuating the hand brake either with the hand brake lever or with the electromotor, there is provided a manually-operated clutch which alternatively or selectively connects the cable pulley, which forms the brake cable tightening device, with either manually operated hand brake lever or with an auxiliary drive including the electromotor. This actuation device provides for both actuation of the parking brake only by muscular energy and actuation of the parking brake only by the electric motor. However, this known actuation device has increased dimensions because the hand brake lever, the tightening element, the switching clutch, and a drive pinion of the electromotor-operated drive need be arranged in a row. Therefore, this actuation device can be fitted in a motor vehicle with a pedal-operated parking brake only with great difficulties and with significant additional expenses.

Accordingly, an object of the present invention is an actuation device for a motor vehicle parking brake which would insure a selective actuation of the parking brake either by muscular energy or with electromotive energy assist, while requiring a smaller mounting space in a motor vehicle.

Another object of the present invention is an actuation device of the above-described type which is characterized by reduced technical expenses.

SUMMARY OF THE INVENTION

These and other objects of the present invention which will become apparent hereinafter, are achieved by forming the drive for actuating the tightening device as a planetary gear drive having a first drive member connectable with the first drive element, a second drive member connectable with the second drive element, and a third drive member connected with the tightening device thereby connecting the first and second drive element selectively with the tightening device.

The use of a planetary gear drive permits to provide means which are formed of inexpensively produced elements and are characterized by small dimensions and which, at the same time, provides for selective or alternating driving of the tightening element with different sources of the driving force. Simultaneously, the use of a planetary gear drive permits to provide a switching element having a simple construction and easily mountable, in particular, a switching element or its actuation element, e.g., a button which is spaced from the planetary gear drive and is located in a vehicle in a place where it is easily accessible to the driver. In addition, the use of a planetary gear drive permits to realize different transmission ratios for actuation the parking brake by a muscular energy and by motorized force.

In an advantageous embodiment of the present invention, the first drive member, which is connected with the drive element driven by the muscular energy-actuated member, is formed as a sun gear of the planetary gear drive, and the second drive member, which is connected with the drive element driven by the auxiliary motor, is formed as a planet wheel carrier of the planetary gear drive. For selectively connecting the drive element, which is driven by the muscular energy-actuated member, with the first drive element, the sun gear, and the drive element, which is driven by the auxiliary motor, with the second drive member of the planetary gear drive, the planet wheel carrier, selectively, the planet wheel carrier on the sun gear, is respectively, blocked. The sun gear and the planet wheel carriers are blocked with respective blocking means which are associated with respective drive elements.

To reduce the constructional dimensions of the actuation device, it is contemplated to form the tightening device, at least partially, as a cable pulley with which the ring gear of the planetary gear drive, which forms the third drive member, is connected for joint rotation therewith. This embodiment of the actuation device contemplates forming the cable pulley and the ring gear as an integral part.

With regard to actuation of the parking brake by muscular energy, it is contemplated to form the muscular energy-actuated member, which drives the drive element associated with the first drive member of the planetary gear drive, the sun gear, as per se known hand brake lever pivotally supported on a motor vehicle body and connected by a control cable and a cable pulley with the sun gear. Alternatively, the muscular energy-actuated member, which drives the drive element connected with the sun gear of the planetary gear drive, can be formed as per se known pedal pivotally supported on the vehicle body and likewise connected with the sun gear by the control cable and the respective cable pulley.

Independent from whether the muscular energy-actuated member is formed as a hand brake lever or a pedal, according to a preferred embodiment of the present invention, the cable pulley, which is associated with the control cable connected with the first drive element driven by the muscular energy-actuated actuated member, is connected with the sun gear supporting shaft by a stop disc of a detent mechanism. The detent mechanism is so formed that the cable pulley becomes connected with the sun gear supporting shaft, i.e., with the sun gear, only upon actuation of the respective drive element.

The switching between the muscular energy actuation and motorized actuation of the parking brake is effected by selective blocking and releasing of the first or second drive member of the planetary gear drive. The blocking and release is effected in such a manner that blocking of the sun gear, which is associated with the muscular energy-actuated drive, the release of the planet wheel carrier, which is associated with the electric motor, and the actuation of the electric motor follow one another. In this regard, according to a first embodiment of the present invention, for blocking the sun gear upon switching to an electromotive driving mode, there is provided a stop element formed as a wrap spring acting on the sun gear or the sun gear supporting shaft and associated with the control cable connected with the muscular energy-actuated member. The wrap spring is preferably self-actuated, actuated, with the release of the wrap spring being preferably effected with a Bowden cable actuatable by a release button or an actuation handle provided in an accessible to the driver region.

According to a second embodiment of the present invention, the blocking of the sun gear upon switching to an electromotive actuation is effected with a sun gear blocking device formed of a pawl and a tooth segment. This blocking device is associated with the control cable which is connected with the sun gear and the muscular energy-actuated member. For releasing the pawl-toothed segment device, advantageously, a release button is provided on the hand brake lever. Of course, the release button can be provided in any other location which is easily accessible to the driver.

In accordance with a further development of the present invention, the transition from the electromotive actuation to the muscular energy actuation of the parking brake is effected by blocking the planet wheel carrier with a stop device including a worm gear drive which connects the electric motor with the planetary wheel carrier.

The electric motor is preferably provided in the region of the driver's seat or another location easily accessible to the driver.

In accordance with a further development of the present invention, a sensor is provided in the brake cable for sensing the tensile load appearing in the brake cable and for generating respective signal communicated to a control device which controls a current source supplying power to the electric motor.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
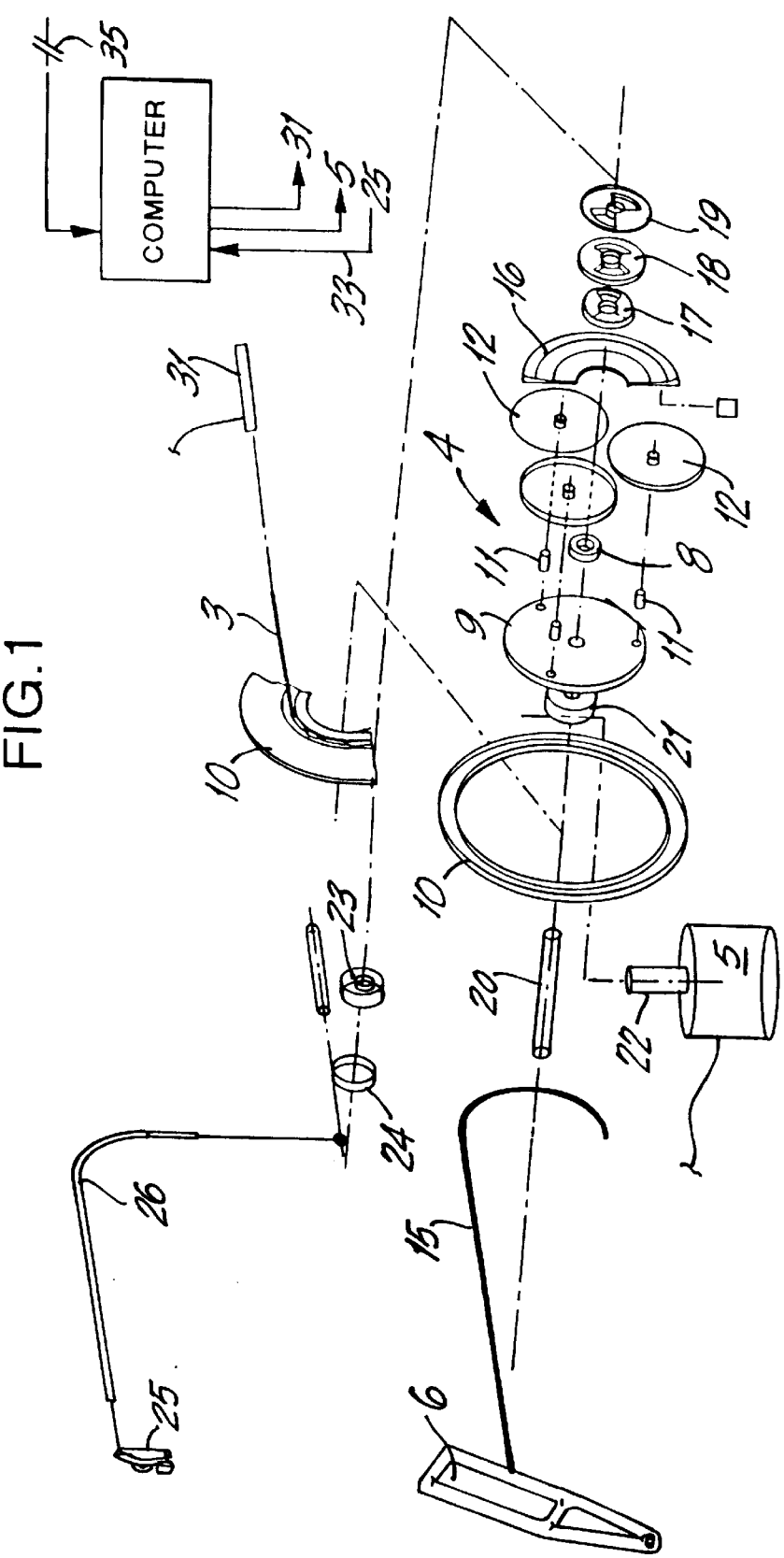
FIG. 1 shows a schematic exploded view of an actuation device according to the present invention for a parking brake of a motor vehicle.

An actuation device according to the present invention for a parking brake, which is shown in the drawings, includes essentially a tightening device 1, a brake cable 3, which connects the tightening device 1 with both brake members 2 for rear axle wheels and with a device for selectively connecting the tightening device 1 with an electromotor 5 or with a muscular energy-actuated member, a hand brake lever 6 or a pedal 7. The connecting device is formed as a planetary gear 4. The planetary gear 4 has three drive members formed, respectively, as a sun gear 8, a planet wheel carrier 9, and a ring gear 10. In both disclosed embodiments, the ring gear 10 is formed integrally with the tightening device 1 which is formed as a cable pulley. The ring gear 10 is alternatively driven by the driven planet wheel carrier 9 or the driven sun gear 8 via planet gears 12 which are supported on the planet wheel carrier 9 by axles 11. When the ring gear 10 is driven by one of the planet wheel carrier 9 and the sun gear 8, the other of these two drive members remains stationary. With a muscular energy actuation of the hand brake, a control cable 15 is driven by the hand brake lever 6 or the pedal 7. The control cable 15 acts on cable pulley 16 which is automatically connected with the sun gear 8 or with the axle 20 carrying the sun gear 8. The cable pulley 16 is connectable with the sun gear 8 or with the sun gear supporting axle 20 by a detent mechanism formed of two lock discs 17 and 18 and back-up disc 19. With this actuation of the parking brake, the planet wheel carrier 9 is kept stationary by the electromotor 5 which is connected with the planet wheel carrier 9 through a worm gear drive 22 and a drive pinion 21 supported on the planet wheel carrier 9.

Figure 2:
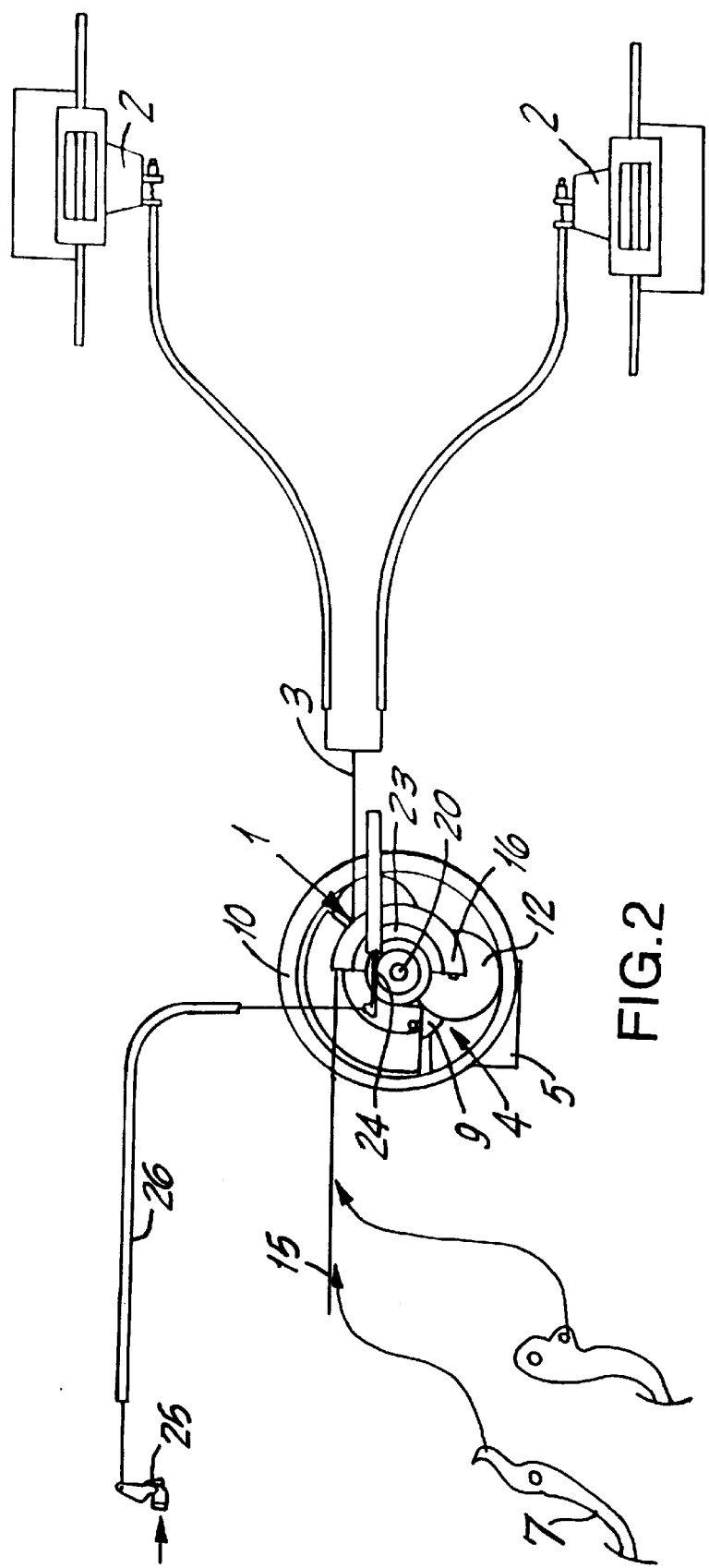
FIG. 2 shows a schematic view of a first embodiment of an actuation device according to the present invention for a parking brake of a motor vehicle.

Upon transition form the muscular energy actuation of the parking brake to the electrical power actuation, the sun gear 8 is kept stationary. To this end, in the embodiment of the actuation device shown in FIG. 2, there is provided a clamp wheel 23, which is supported on the shaft 20 of the sun gear 8, and an enveloping it wrap spring 24. To keep the sun gear 8 stationary, the wrap spring 24 is brought in its engaging position. Simultaneously with the resetting of the wrap spring 24 and thereby fixing of the sun gear 8, a switch of the power source of the electric motor 5 can be actuated which would result in actuation of the electric motor 5 and, thereby, of the planet wheel carrier 9. The switch of the power source of the electric motor 5 and an actuation button or an actuation handle 25 for effecting the engagement and disengagement of the wrap spring 24 are formed in the embodiments shown in the drawings integrally with each other. The actuation button or handle 25 is connected with the wrap spring 24 by a Bowden cable 26.

Figure 3:
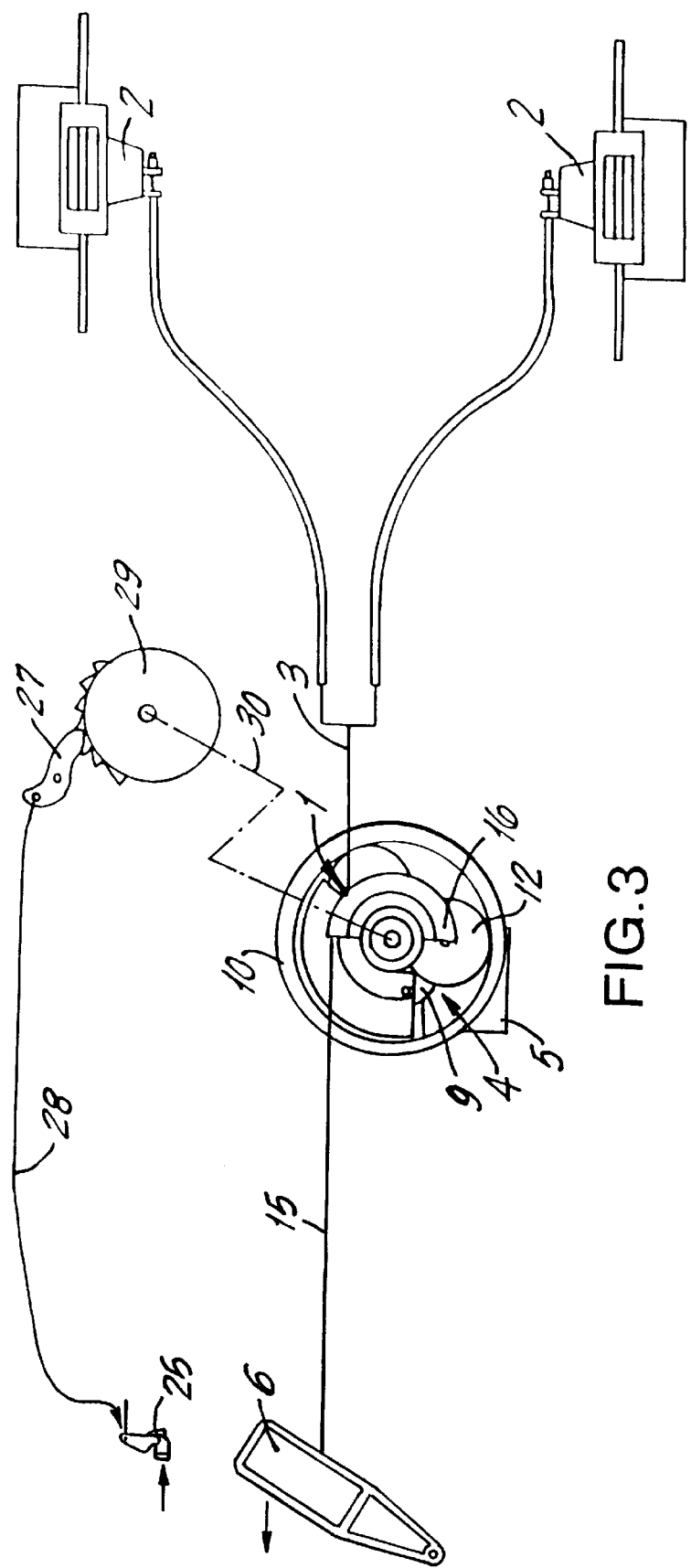
FIG. 3 shows a schematic view of a second embodiment of an actuation device according to the present invention for a parking brake of a motor vehicle.

In the embodiment shown in FIG. 3, the arrangement for fixing the sun gear 8 is formed as a ratchet mechanism the ratchet pawl 27 of which is connected with the actuation button or handle 25 by a Bowden cable 28, and the toothed segment 29 of which is connected with the sun gear 8 by a connector 30.

A sensor 31 is arranged in the hand brake cable 3 for sensing the tensile load of the hand brake cable 3. The sensor 31 generates signal indicative of the tensile stress values and transmits the tensile stress value signals to a computer 32 which forms part of the power source circuit for the electric motor 5. At each electrical release of the parking brake, an automatic readjustment of the brake cable 3 for compensating eventually occurring cable elongations and/or wear of the brake linings takes place.

Because the sensor 31 communicates the tensile stresses generated in the brake cable 3 to the computer 32, which controls the power supply to the electric motor 5 in accordance with the tensile stress values in the brake cable 3, an analogous continuous control of actuation of the parking brake can be achieved by connecting, with appropriate connection means 33, the actuation button or handle 25 with the computer 32. Thereby, a braking-release function becomes available which enables an effortless driving along a slope even with the electrical power actuation.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed:

1. An actuation device for a cable-operated parking brake of a motor vehicle and which enables actuation of the parking brake selectively by muscular energy or with a motive power assist, the actuation device comprising:
    a muscular energy-actuated member for actuating the parking brake;
    an auxiliary motor for actuating the parking brake;
    a brake cable tightening device; and
    drive means for actuating the brake cable tightening device and including:
    first and second drive elements connected, respectively, with the muscular energy-actuated member and the auxiliary motor, and
    planetary gear drive having a first drive member connectable with the first drive element; a second drive member connectable with the second drive element, and a third drive member connected with the tightening device thereby connecting the first and second drive element selectively with the tightening device.

2. An actuation device as set forth in claim 1, wherein the first drive member is formed by sun gear of the planetary gear drive, and the second drive member is formed as a planet wheel carrier of the planetary gear drive.

3. An actuation device for a cable-operated parking brake of a motor vehicle and which enables actuation of the parking brake selectively by muscular energy or with a motive power assist, the actuation device comprising:
    a muscular energy-actuated member for actuating the parking brake;
    an auxiliary motor for actuating the parking brake;
    a brake cable tightening device;
    drive means for actuating the brake cable tightening device and including:
    first and second drive elements connected, respectively, with the muscular energy-actuated member and the auxiliary motor, and
    a planetary gear drive having a first drive member connectable with the first drive element; a second drive member connectable with the second drive element, and a third drive member connected with the tightening device thereby connecting the first and second drive element selectively with the tightening device, wherein the first drive member is formed by sun gear of the planetary gear drive, and the second drive member is formed as a planet wheel carrier of the planetary gear drive; and
    first means for blocking the planet wheel carrier to provide for connection of the sun gear with the first drive element, and second means for blocking the sun gear to provide for a connection of the second drive element with the planet wheel carrier.

4. An actuation device as set forth in claim 3, wherein the tightening device comprises a cable pulley, and the third drive member is formed as a ring gear of the planetary gear drive and is connected with the cable pulley for a joint rotation therewith.

5. An actuation device as set forth in claim 3, wherein the muscular energy-actuated member is formed as a hand brake lever pivotally supported on a motor vehicle body, and wherein the first drive element comprises a control cable and a further cable pulley for connecting the hand brake cable with the sun gear.

6. An actuation device as set forth in claim 3, wherein the muscular energy-actuated member is formed as a pedal pivotally supported on a motor vehicle body, and wherein the drive element comprises a control cable and a further cable pulley for connecting the hand brake cable with the sun gear.

7. An actuation device as set forth in claim 5, further comprising a blocking mechanism including a blocking disc for connecting the further cable pulley with a sun gear supporting shaft, the further cable pulley being connectable with the sun gear supporting shaft upon actuation of the muscular-energy actuated member.

8. An actuation device as set forth in claim 6, further comprising a blocking mechanism including a blocking disc for connecting the further cable pulley with a sun gear supporting shaft upon actuation of the muscular-energy actuated member.

9. An actuation device as set forth in claim 5, further comprising stop means associated with the further cable pulley and which is formed as a wrap spring acting on the sun gear supporting shaft.

10. An actuation device as set forth in claim 5, further comprising stop means having a pawl and a toothed segment and associated with the further cable pulley.

11. An actuation device as set forth in claim 6, further comprising stop means associated with the further cable pulley and which is formed as a wrap spring acting on the sun gear supporting shaft.

12. An actuation device as set forth in claim 6, further comprising stop means having a pawl and a toothed segment and associated with the further cable pulley.

13. An actuation device as set forth in claim 3, wherein the auxiliary motor comprises an electromotor.

14. An actuation device as set forth in claim 13, wherein the second blocking means comprises a worm gear drive arranged downstream of the electric motor.

15. An actuation device as set forth in claim 14, further comprising an actuation button for actuating the electromotor.

16. An actuation device as set forth in claim 9, further comprising a release button for releasing the wrap spring and a Bowden cable for connecting the release button with the wrap spring.

17. An actuation device as set forth in claim 16, wherein the release button is provided on the hand brake lever.

18. An actuation device as set forth in claim 13, further comprising a sensor for sensing tensile stresses generated in the brake cable, and control means for controlling power supply to the electric motor in accordance with sensor generated signals.

* * * * *